May 9, 1939.                R. W. BAILEY                    2,157,885
                JOINT FOR PIPES AND OTHER METAL MEMBERS
                        Filed Sept. 13, 1937
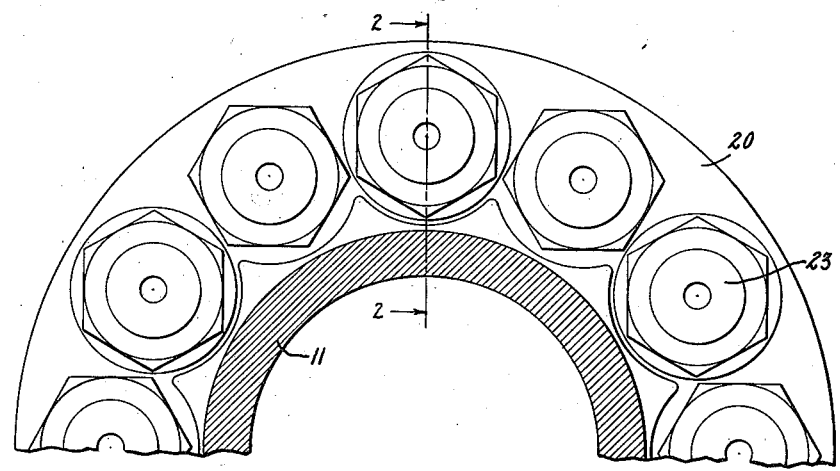
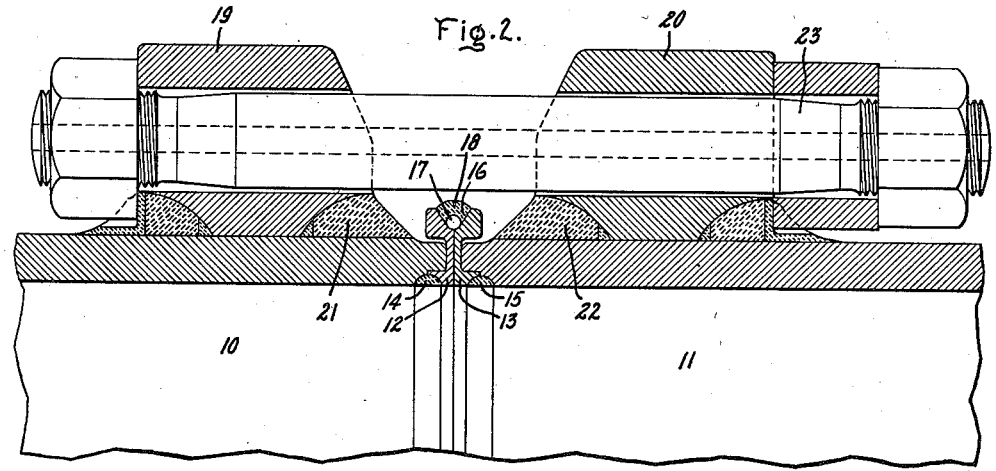
Inventor:
Richard W. Bailey,
by Harry E. Dunham
His Attorney.

Patented May 9, 1939

2,157,885

UNITED STATES PATENT OFFICE 2,157,885

JOINT FOR PIPES AND OTHER METAL MEMBERS

Richard William Bailey, Hale, England, assignor to General Electric Company, a corporation of New York Application September 13, 1937, Serial No. 163,692
In Great Britain September 14, 1936

2 Claims. (Cl. 285—137)

This invention relates to joints for pipes and other metal members which are effected by means of a welded seam forming a sealing weld between two opposite faces of the joint.

In cases where such joints may from time to time be required to be broken and remade, necessitating for this purpose the removal of the weld metal from the welding cleft or groove and its subsequent replacement by other weld metal, there is liable to occur a deepening of the welding groove due to the surface welding fusing the metal at the bottom of the groove and increasing the actual depth of the weld beyond the bottom of the groove.

The object of my invention is to provide an improved arrangement and method of welding whereby such deepening and substantial alteration in the form of the welding groove is avoided. To this end, in effecting a welded seam joint between two metal members a metal wire strip or ribbon is laid along the bottom of the welding groove prior to the deposition therein of weld metal. With this provision it is contemplated that, when the weld metal is deposited in the welding groove, said weld metal will fuse with the metal wire strip or ribbon somewhat incompletely, that is to say it will be incapable of fusing throughout the whole cross-section of the said wire strip or ribbon and thus with the surface at the bottom of the groove. Accordingly, when the weld metal is removed from the welding groove in order to break the joint, the initial formation of the bottom of the groove will be preserved intact. In remaking the joint a fresh wire strip or ribbon will be laid along the bottom of the welding groove and weld metal will then be deposited in the groove.

In practising the invention any suitable cross-sectional form of wire strip or ribbon may be employed, the shape being determined to some extent by the shape of the welding groove and the welding conditions.

Evidently, by appropriate choice of the formation and cross-sectional area of the wire strip or ribbon, and by the utilization, in breaking the joint, of such cutting tool or process as will result in a groove of substantially the same formation as that initially provided to accommodate the weld metal, the operation of breaking and remaking a joint may be effected repeatedly without deformation of the welding groove and the consequent variation of the amount of weld metal.

For a better understanding of what I believe to be novel and my invention, attention is directed to the following description and the claims appended thereto in connection with the accompanying drawing.

In the drawing Fig. 1 illustrates a sectional view of a welded pipe embodying my invention and Fig. 2 shows a section along the lines 2—2 of Fig. 1.

The arrangement in the drawing comprises a pipe having sections 10 and 11 in alinement. A collar 12 and 13 respectively is secured to each end of the sections 10 and 11 by means of welds 14 and 15 respectively. A groove 16 is cut into the cylindrical outer surface formed by the two collars 12 and 13. A metal strip, in the present instance a round wire, 17 is arranged in the bottom of the groove 16 and as shown in the drawing conforms to the shape of the groove 16, thus filling the bottom portion of the groove. After the wire 17 is placed into the groove the two collars 12 and 13 are united by welding material 18 filling the rest of the groove 16. The two pipe sections 10 and 11 in addition are rigidly secured together by means of flanges 19 and 20 fastened to the pipe sections by welds 21 and 22 and mechanically secured together by means of a plurality of bolts 23.

What I claim as new and desire to secure by Letters Patent in the United States is:

1. A welded structure comprising two metal members having a groove in their adjacent portions, a strip of metal conforming to the shape of and located in the bottom portion of the groove, and welding material filling the rest of the groove.

2. A welded pipe structure comprising two pipe sections, a collar welded to the end face of each pipe section, the two collars forming a joint, a groove in the outer surface of the two collars having a rounded bottom, a wire in the groove filling substantially the bottom portion thereof, and welding material filling the rest of the groove, said wire preventing complete fusion of the collars near the bottom of the groove.

RICHARD WILLIAM BAILEY.